US009297159B2

(12) United States Patent
Darden

(10) Patent No.: US 9,297,159 B2
(45) Date of Patent: Mar. 29, 2016

(54) POWER LOCK SYSTEM FOR STAGE TRUSS TOWERS

(71) Applicant: Bruce William Darden, San Antonio, TX (US)

(72) Inventor: Bruce William Darden, San Antonio, TX (US)

(*) Notice: Subject to any disclaimer, the term of this patent is extended or adjusted under 35 U.S.C. 154(b) by 0 days.

(21) Appl. No.: 14/474,171

(22) Filed: Aug. 31, 2014

(65) Prior Publication Data

US 2016/0060861 A1    Mar. 3, 2016

Related U.S. Application Data

(60) Provisional application No. 61/875,937, filed on Sep. 10, 2013.

(51) Int. Cl.
| | | |
|---|---|---|
| *E04B 1/34* | (2006.01) | |
| *E04B 1/343* | (2006.01) | |
| *E04B 1/41* | (2006.01) | |
| *E04C 3/08* | (2006.01) | |
| *E04H 12/18* | (2006.01) | |
| *G05B 19/05* | (2006.01) | |
| *E04C 3/04* | (2006.01) | |

(52) U.S. Cl.
CPC ......... *E04B 1/34331* (2013.01); *E04B 1/34384* (2013.01); *E04B 1/40* (2013.01); *E04C 3/08* (2013.01); *E04H 12/18* (2013.01); *G05B 19/058* (2013.01); *E04C 2003/0486* (2013.01)

(58) Field of Classification Search
CPC ... E04B 1/34331; E04B 1/34384; E04B 1/40; E04B 1/3522; E04C 3/08; E04C 12/18; E04C 2003/0486; E04H 3/28; A63J 1/02; G05B 19/058; B66B 5/26; B66B 7/066; B66B 11/0075; B66B 11/0461; B66B 11/0469
USPC ............................................................ 52/28
See application file for complete search history.

(56) References Cited

U.S. PATENT DOCUMENTS

| | | | | |
|---|---|---|---|---|
| 896,792 | A | * | 8/1908 | Bath .................... B66B 5/26 187/378 |
| 3,722,863 | A | | 3/1973 | Itoh et al. |
| 4,015,686 | A | | 4/1977 | Bushnell, Jr. |
| 4,484,421 | A | | 11/1984 | Williams et al. |
| 4,512,117 | A | * | 4/1985 | Lange .................. E04H 3/10 403/331 |
| 5,551,199 | A | | 9/1996 | Hayes et al. |
| 8,210,311 | B1 | * | 7/2012 | Rice .................... A62B 1/20 182/100 |

OTHER PUBLICATIONS

James L. Moody & Paul Dexter, Concert Lighting: Techniques, Art & Business, 3rd edition, 2010. pp. 143-155. ISBN:978-0-240-80689-1.

(Continued)

*Primary Examiner* — Patrick Maestri

(57) ABSTRACT

A power lock system for stage truss towers for remotely locking a climbing truss sleeve block with its tower, thereby distributing the downward load directly into the tower and preventing upward motion. The power lock system for stage truss towers generally includes a remotely controlled locking mechanism that is mounted within a truss tower section with adjustable locations. The sleeve that slides or rolls up the tower is equipped with stirrups to provide a structural receptacle for the locking forks. The sleeve and the locking mechanism are equipped with sensors that indicate the sleeve is in the correct location for locking. The control system displays the status of the sensors and limit switches and uses logic to exercise the rules of operation.

9 Claims, 10 Drawing Sheets

(56) References Cited

OTHER PUBLICATIONS

James Thomas Engineering, Knoxville, TN., 2010. Catalog. pp. E5-E6.
Proltyte, Wakefield, U.K. Catalog. https://www.prolyte.com/uploads/bestanden/Productsheets/mpt-tower-productsheet-1.pdf pp. 90-91. Accessed Aug. 16, 2014.
Applied Electronics, Newport News, VA. Catalog. http://www.appliednn.com/pdfs/AEI2016.pdf p. 42 Accessed Aug. 24, 2014.
Arcofab, Saint-Augustin-De-Desmaures, QC, Canada. Catalog. www.arcofab.com Catalog.pdf p. 10/2010. Accessed Aug. 24, 2014.
Total Structures, Ventura, CA. Catalog. Accessed Oct. 3, 2014 http://wvvvv.totalstructures.com/techdata/pdf_datasheets/ground_support_series12.pdf.
Tomcat, Knoxville, TN. Catalog. http://www.tomcatglobal.com/Products/Ground-support-systems/Ground-Support-Systems/16-Ground-Support-System/ Accessed Aug. 24, 2014.
Show Group Production Services, North Las Vegas, NV. Catalog. http:/www.sgps.net/ground_support_systems2.html Accessed Aug. 17, 2014.
Wonder Truss, Sarno SA, Italy. Catalog. http:/www.wondertruss.ch/TW50S.html Accessed Aug. 17, 2014.

* cited by examiner

POWER LOCK SYSTEM FOR STAGE TRUSS TOWERS

CROSS-REFERENCE TO RELATED APPLICATIONS

This application claims the benefit of provisional patent application Ser. No. 61/875,937, filed Sep. 10, 2013 by the same inventor.

BACKGROUND-PRIOR ART

The following is a tabulation of some prior art that presently appears relevant:

PATENTS

| | | |
|---|---|---|
| 3,722,863 | Lift Apparatus Mar. 27, 1973 | Itoh et al |
| 4,015,686 | Portable Multi-stage Mechanical List Apr. 5, 1977 | Bushnell, Jr. |
| 4,484,421 | Traveling Stage Nov. 27, 1984 | Williams et al |
| 5,551,199 | Box Truss for Lights Sep. 3, 1996 | Hayes et al |
| 5,743,066 | Box Truss for Ligths Apr. 28, 1998 | Hayes et al |

NON-PATENT LITERATURE DOCUMENTS

ANSI E1.21-2013 Entertainment Technology—Temporary Structures Used for Technical Production of Outdoor Entertainment Events
ANSI E1.2-2012 Entertainment Technology—Design, Manufacture and Use of Aluminum Trusses and Towers
ANSI E1.6-3-2012 Selection and Use of Serially Manufactured Chain Hoists in the Entertainment Industry
ANSI E1.6-4-2013 Portable Control of Fixed-Speed Electric Chain Hoists in the Entertainment Industry
Concert Lighting: Techniques, Art & Business, Moody, James L. & Dexter, Paul, 2009. Pages 143-156.
Catalog, James Thomas Engineering, JTE-Tower 12×12-99
Catalog, Prolyte, MPT Tower
Catalog, Applied Electronics, Ground Support Tower Systems
Catalog, Arcofab, SS-1
Catalog, Total Structures, Ground Support Series 12
Online Catalog, TomCAT, Ground 16
Online Catalog, Show Group Production Services, Ground Support Systems
Online Catalog, Wonder Truss TW50S

BACKGROUND OF THE INVENTION

The present invention relates generally to and more specifically it relates to a power lock system for stage truss towers for remotely locking a climbing truss sleeve block with its tower, thereby distributing the downward load directly into the tower and preventing upward motion. A climbing ground support truss system consists of one or more towers equipped with a hoisting mechanism. A two tower system is referred to as a goal post. A three tower system may be a straight line or form an L-shape. A typical stage arrangement is a square or rectangle supported by four towers in the corners. Larger stages are equipped with six, eight, ten or more towers depending on the plan view arrangement. In addition, there are side additions referred to as PA wings which support audio equipment and add additional towers to the system. Ground support systems may be erected indoors at locations such as convention centers, arenas, film studios, or indoor football stadiums. Many systems are erected outdoors where there is no other overhead structure available to suspend the load. Most outdoor structures are equipped with a roof canopy for sunshade and protection from the elements. The structure of the tent canopy plus potential rain and snow load use up a large percentage of the available loading capacity. Many systems also have sidewall curtains which wrap around the stage that increase the wind exposure. Significant allowance must also be made for wind and seismic loads, depending on the location where the truss is to be erected. In addition to the loads previously described, there are loads from stage lighting, electrical cables, video screens, scenery, flying performers and speakers. Most of this equipment is suspended from the roof grid structure by secondary hoists.

The earliest ground support truss systems were developed over 25 years ago and were copied and improved by manufacturers across Europe, America and now Asia such that most systems look and operate in a similar manner. Attend several summer concerts or visit an international trade show and it becomes evident that the form and function of these components have been successfully manufactured by many companies around the globe. The majority of these systems are raised by a chain motor system, although wire rope and alternate climbing arrangements are used. Chains are preferred over wire rope because they do not foul when they are slack. The most common truss towers have a rolling or sliding sleeve which acts as a connecting node for horizontal truss members that connect to additional towers at their sleeves. The chain hoist motor is attached to the sleeve or adjacent to a horizontal section of the truss. The chain extends up to the top of the tower, where a device known as a roller beam or head block is equipped with special pulley sheaves that are grooved to accommodate chain. The chain passes over one or more sheaves and returns to another section of the horizontal truss or the sleeve. This configuration is known as 2-part reeving that doubles the lifting capacity of the chain motor.

Most chain motors are asynchronous motors and travel at approximately 16 FPM. Due to the mechanics of the drive, they travel at slightly different speeds depending on the load, age, maintenance and specific manufacture of the hoist. Since they are 2-parted, they travel at 8 FPM or 1.6 inches per second. The usual hoist model selected is a 1-ton variant, which offers 2-tons of lift in a 2-part configuration. When the load is raised into position, the sleeve which travels along the truss must be locked off at its high trim position. This must be done to secure the load if one of the hoisting chains were to sever or the brake or clutch were to slip. In most cases, it must also be done because secondary hoists will add more load to the roof structure than the primary hoists can support. The tower chain motors raise the roof and mother grid to their high trim where they are locked off.

Then additional load is imposed by chain motors that are rigged to the primary roof structure. They hoist the lighting, scenery, video and audio loads in to show position. For that reason, when the grid and canopy are initially raised, the tower hoists are not carrying the entire load which will eventually be transmitted to the towers. A typical 15 inch tower is rated for a load of 4 tons and can be up to 40 feet tall. Larger towers carry substantially greater loads, have the ability to be erected to increased heights, and offer more stability from wind and seismic loads. Remember, the typical hoist only had a capacity of 2-tons after it was 2-parted. Therefore, with the addition of wind, rain, or snow, the lifting chain motor does not have the capacity to hold the amount of load that will be suspended from the roof truss. The load must be transferred to the tower via the locking method. In addition, there is the possibility of wind gusts that would lift the tent canopy, actually raising the roof truss higher, and then dropping it which could shock load and break the lifting chain.

How is the typical truss system locked off to the tower which supports it? Regardless of the method, it requires a stagehand to climb each tower. One common method uses woven slings and shackles to create an alternate load path over the top of the tower. If the towers were erected indoors over level concrete this is a fairly simple thing to do because the slings would be identical at all four (or more) towers. In the case of outdoors set-up, towers are located on grass or asphalt parking lots which are usually pitched for drainage. The base of each tower has a different height of several inches and in some cases several feet. Roof systems erected on a hillside may have as much as 10 feet of differential between the various tower base supports. This requires the adjustment of the slings to equally load them at the same elevation. The use of round turns and twists in the slings are used to make length adjustments. Not every structural tube on a tower can support the loads imposed. It is actually rather difficult to explain that to a man who has climbed up 40 feet and is looking for the perfect place to connect the load.

After the locking system is attached, the chain motors are bumped or inched down until the load is transferred onto the slings. Then the chain motors are bumped up to almost tension the chain. Alternatively, ratchet straps are connected to the structure which pass over the head block and back down to the sleeve block. In some cases additional clamps, slings, chains, turnbuckles or cables are used to provide resistance against further travel.

Unless there are sufficient climbing riggers for each tower, this must be repeated several times by the same stagehands which consumes a considerable amount of time. After the towers are secure, additional loads such as lighting and sound may be assembled and raised by chain motors attached to the roof grid.

In the case of inclement weather, the amount of time to reverse this procedure directly impacts the "Wind Action Plan", part of the OMP document required by ANSI standard. Ideally, heavy loads such as speaker arrays, video walls and lighting truss will be landed onto the stage deck. If guide wires are properly designed, the roof truss can now be lowered. Except for those locking slings and ratchets. Now that the wind is blowing harder and the lighting has started, the idea of sending six of your friends up a slippery aluminum tower is unlikely to happen. Best to wait it out in the tour bus.

SUMMARY OF THE INVENTION

The purpose of this invention is to provide a remotely operated locking system for truss towers. The lock mechanism is installed in the upper regions of the truss tower before it is tipped up. The special tower section is equipped with adjustment holes 1 inch on center over a 30 inch range. When the towers are assembled at ground level, a transit style laser is used to establish the height of each truss at the hinge block. Using those readings, the locking mechanism is located at the exact elevation required before it is raised into position. A combined power and control cable is routed from the locking mechanism through the center of the tower. The tower is then tipped up to vertical.

The truss and roof tent are assembled and raised into position via chain motors using the normal procedure. The roof operator bumps the truss into final position, such that the stirrups located on the sleeve are in line with the forks on the locking mechanism. Lock mechanisms have sensors or limit switches that indicate at the controller that the stirrup is low, aligned, or high. When the stirrups are aligned, the forks may be extended via electrical operation which takes approximately 5 seconds per tower. The locking forks are equipped with a limit switch that indicates that the fork is fully extended and prevents overtravel. The roof operator lowers the truss to rest onto the locking mechanism, known as slacking the chains. This effectively transfers the load attachment point an average of 5 feet lower onto the tower than systems rigged the traditional method.

In the case of a "Wind Action" the lighting, video and audio loads are lowered to the deck. The roof operator bumps his chain motors to lift the roof off of the stirrups. The forks are retracted, and then the roof is lowered. This process did not require any stagehands to climb the towers. It is possible that with prompt action and this equipment the tragedies of recent summer music concerts may be prevented.

OBJECTS OF THE INVENTION

An object is to provide a power lock system for stage truss towers for remotely locking a climbing truss sleeve block with its tower, thereby distributing the downward load directly into the tower and preventing upward motion. In the first embodiment, the locking mechanism is housed within the tower, and drives locking forks horizontally in an outward motion, engaging into stirrup receptacles mounted onto the sleeve block. In the second embodiment, the locking mechanism is an integral part of the sleeve, and thrust the locking forks inward into the truss tower which has been fitted with receptacles for receiving and locking the forks.

Another object is to provide a Power Lock System for Stage Truss Towers that secures the sleeve block and truss element in such a fashion as to provide a load path to the tower base. The structural housing of the lock mechanism is pinned into the truss tower at 4 locations. The lock must be assumed to be asymmetrically loaded with 75% of the load on one fork while continuing to maintain the required factor of safety. In most scenarios the load is predominately in the down direction, which applies a prying action by means of fulcrum towards the center of the lock enclosure. Simultaneously, the perimeter of the lock mechanism acts as the fulcrum and must resist forces in a shearing and prying direction. The sleeve block must be capable of enduring the crushing loads to component tubing as well as tear out and shear of materials.

Another object is to provide a Power Lock System for Stage Truss Towers that prevents the sleeve block or truss element from traveling upwards or downwards when locked. The downward motion is generally accepted to be the effects of gravity from the sleeve and all of the roof and truss components. The uplift occurs predominately when gusts of winds or fast approaching storms with sustained wind do not allow the roof structure to be lowered. Without the locks, wind lifts the roof and the sleeves slide upwards. When the gust subsides, the rapid drop of the roof creates a shock load capable of shearing the lock off slings, cables and straps. The impact is severe enough to rupture the aluminum structure, deform hooks, or disconnect the end of the strap previously held in tension. The entire load is transferred to the hoist chain with the impact factor from the rapid drop. Seismic loads challenge the connection between the sleeve and truss by changing the relative location of the tower base. The moving, rolling and shaking of the ground raises and lowers the tower pushing it up against the sleeve. For this reason in some zip codes the effects of seismic activity exceed the allowance for wind.

Another object is to provide a Power Lock System for Stage Truss Towers that provides a fine gradient of adjustment for the ultimate trim height of the sleeve and truss elements. The acceptable deflection of trusses suitable for ground support systems is in excess of 1" over the span between adjacent towers. For that reason, the gradient of 1" was chosen for adjustment of the tower lock mechanisms.

Another object is to provide a Power Lock System for Stage Truss Towers that secures the sleeve block and truss load when locked-off when the primary hoist is slack.

Another object is to provide a Power Lock System for Stage Truss Towers that has a load carrying capacity equivalent or superior to the load capacity of the tower.

Another object is to provide a Power Lock System for Stage Truss Towers that is remotely operated without the need for personnel to climb the towers in order to install or operate.

Another object is to provide a Power Lock System for Stage Truss Towers that provides remote feedback to the truss operator indicating that the sleeve and truss elements are positioned at the correct elevation for lock-off.

Another object is to provide a Power Lock System for Stage Truss Towers that provides remote feedback from the locking forks and indicates that the forks are fully extended and vertical travel is not possible.

Another object is to provide a Power Lock System for Stage Truss Towers that provides remote feedback from the locking forks and indicates that the forks are fully retracted and vertical travel is possible.

Another object is to provide a Power Lock System for Stage Truss Towers that provides a control system that signals when the locking forks are in the ambiguous position of partially locked or partially unlocked.

Another object is to provide a Power Lock System for Stage Truss Towers that is equipped with a manual system that does not require power for emergency operation if an electrical component or cable should fail.

Another object is to provide a Power Lock System for Stage Truss Towers that is equipped with a manual system that does not require power for testing the mechanism during assembly.

The invention generally relates to a tower lock for truss which includes a remotely controlled locking mechanism that is mounted within a truss tower section with adjustable locations. The sleeve that slides or rolls up the tower is equipped with stirrups to provide a structural receptacle for the locking forks. The sleeve and the locking mechanism are equipped with sensors that indicate the sleeve is in the correct location for locking. The control system displays the status of the sensors and limit switches and uses logic to exercise the rules of operation.

There has thus been outlined, rather broadly, some of the features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
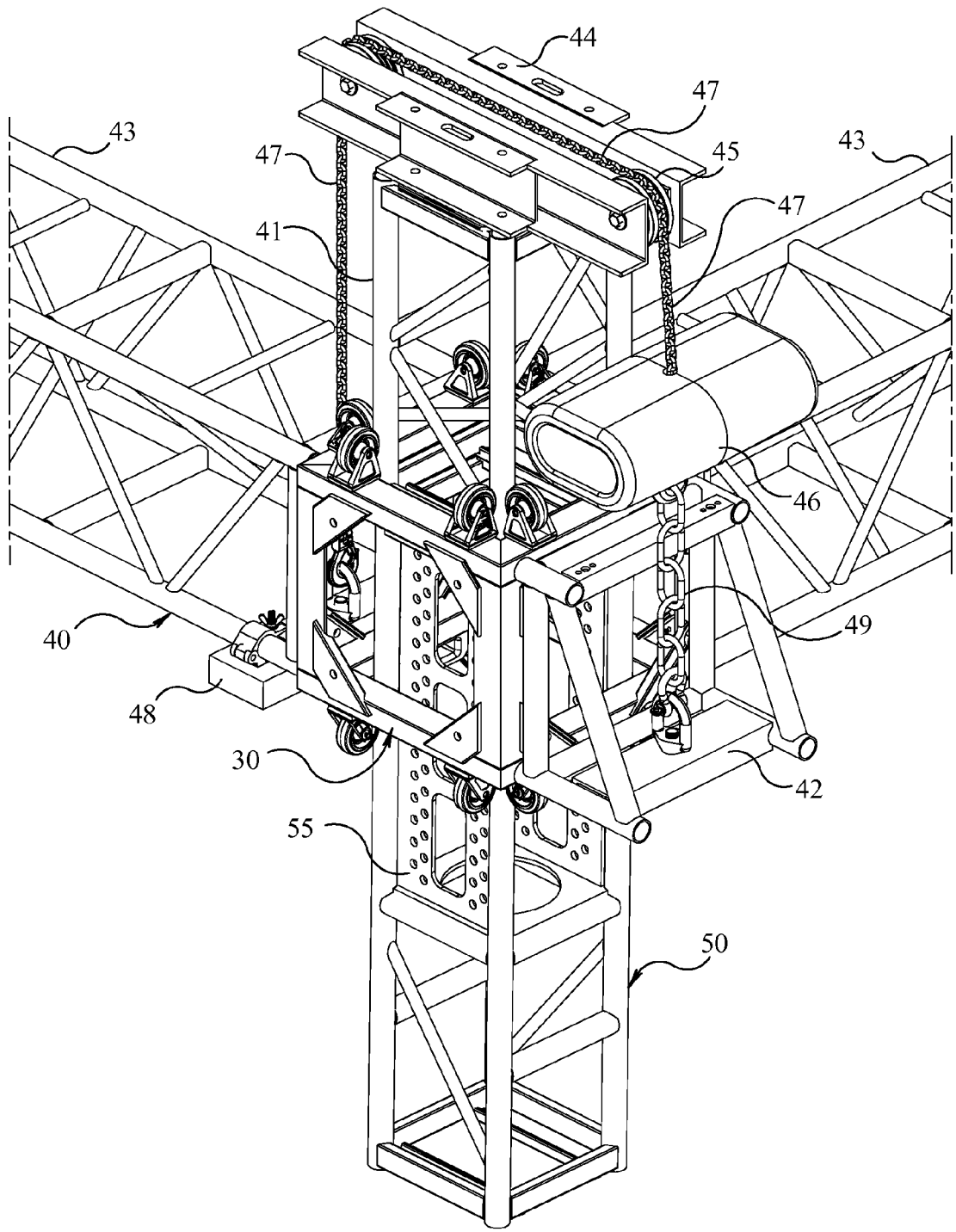
FIG. 1 is an upper perspective view of the mechanical system. This is a typical corner configuration of a self-climbing tower hoist rigged in the normal fashion with the chain hoist lifting mechanism incorporating two-part reeving. The tower is fitted with the lock mounting to engage the sleeve at high trim.

Turning now descriptively to the drawings, in which similar reference characters denote similar elements throughout the several views, the figures illustrate a remotely controlled locking mechanism that is mounted within a truss tower section with adjustable locations. The sleeve that slides or rolls up the tower is equipped with stirrups to provide a structural receptacle for the locking forks. The sleeve and the locking mechanism are equipped with sensors that indicate the sleeve is in the correct location for locking. The control system displays the status of the sensors and limit switches and uses logic to exercise the rules of operation.

FIG. 1 is an overall perspective view of the first embodiment. This typical corner configuration of a self-climbing tower hoist is rigged in the normal fashion with sleeve with stirrups (30) and tower with lock mounting (50). The horizontal sections of truss (43) attach to the sleeve (31). The chain hoist lifting mechanism (46) attaches to the lifting bracket (42). The lifting chain (47) follows the path around the sheaves (45) that are supported by the roller beam (44). The chain attaches to the horizontal truss (43) by means of a lift point bracket (48) completing the two-part reeving. The tower with lock mounting (50) is topped by a standard section of truss tower (41) and supported by numerous sections of standard truss tower below.

Figure 2:
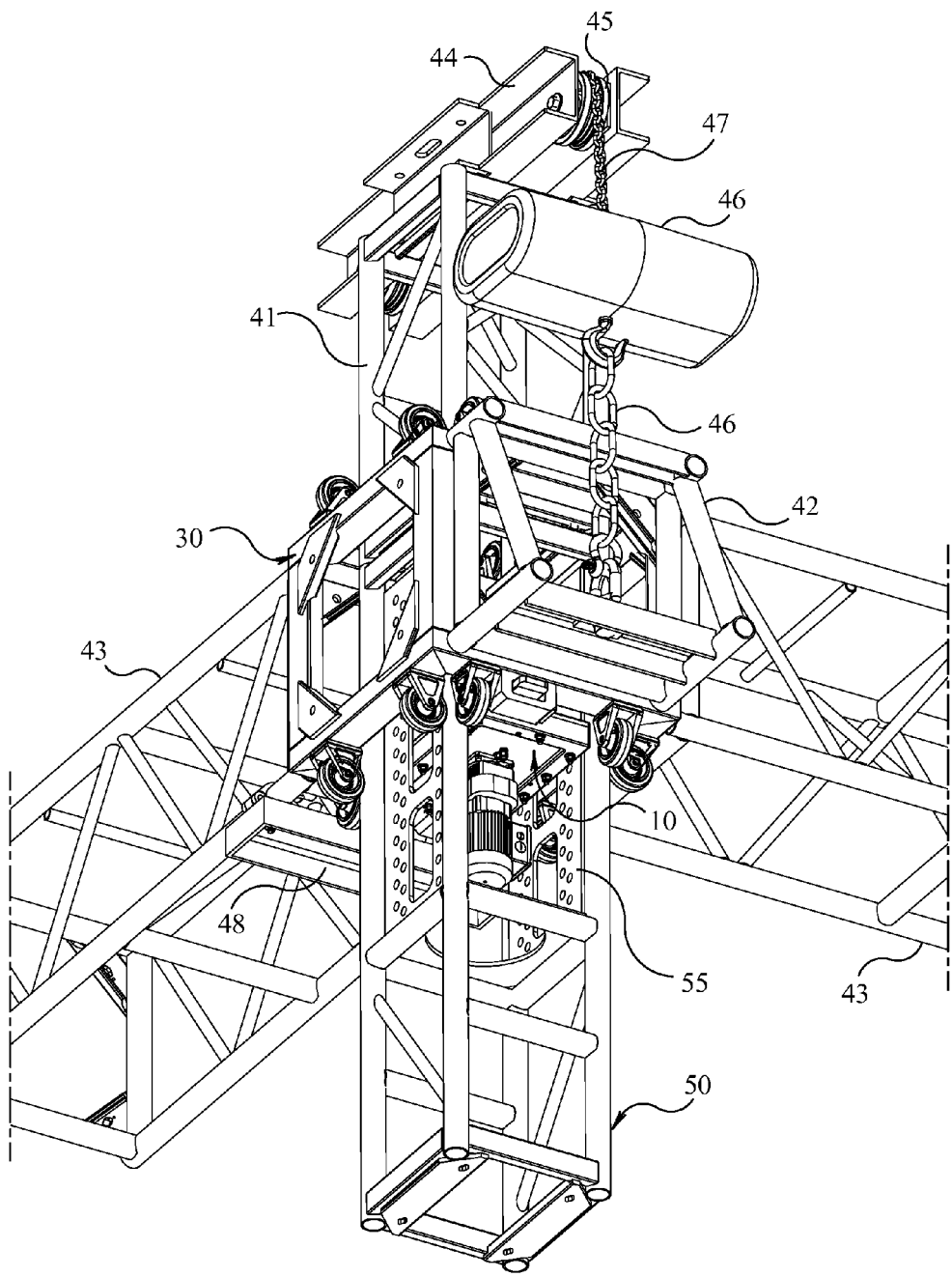
FIG. 2 is a lower perspective view of the mechanical system. The same typical corner configuration of a self-climbing tower from FIG. 1 reveals the location of the tower lock mechanism, mounted in the tower with lock mounting, and with the lock mechanism forks engaged to the sleeve with stirrups.

FIG. 2 is a lower perspective view of the first embodiment. This typical corner configuration of a self-climbing tower hoist rigged in the normal fashion with the tower lock mechanism (10), sleeve with stirrups (30), and tower with lock mounting (50). The horizontal sections of truss (43) attach to the sleeve (31). The chain hoist lifting mechanism (46) attaches to the lifting bracket (42). The lifting chain (47) follows the path around the sheaves (45) that are supported by the roller beam (44). The chain attaches to the horizontal truss (43) by means of a lift point bracket (48) completing the two-part reeving. The lock mechanism (10) mounts in the tower with lock mounting (50).

Figure 3:
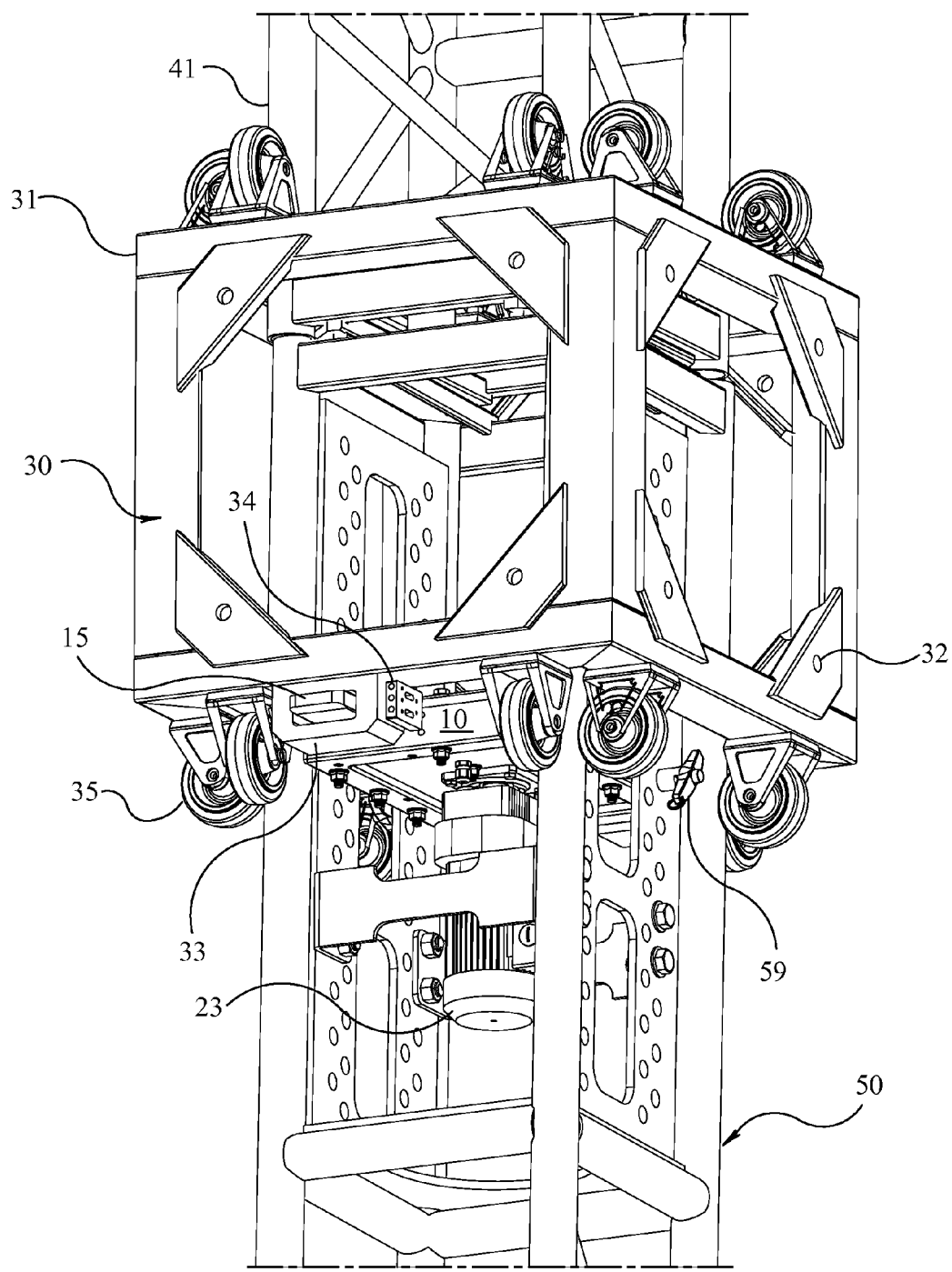
FIG. 3 is a lower perspective view of the tower and lock system. The extraneous portions of typical rigging are deleted from this view to focus on the lock mechanism, the lock mounting, and the sleeve. The reciprocating lock forks are extended into the stirrups for fork engagement. The target and position sensors are visible.

FIG. 3 is a lower perspective detail view of the first embodiment. The extraneous portions of typical rigging are deleted from this view to focus on the lock mechanism (10) and the sleeve (30). The reciprocating lock forks (15) extend into the stirrups for fork engagement (33). The nodes (32) are typical for various sizes and configurations of horizontal truss. The gearmotor (23) propels the forks into position. The tower with lock mounting (50) is topped by a standard section of truss tower (41) and supported by numerous sections of standard truss tower below.

Figure 4:
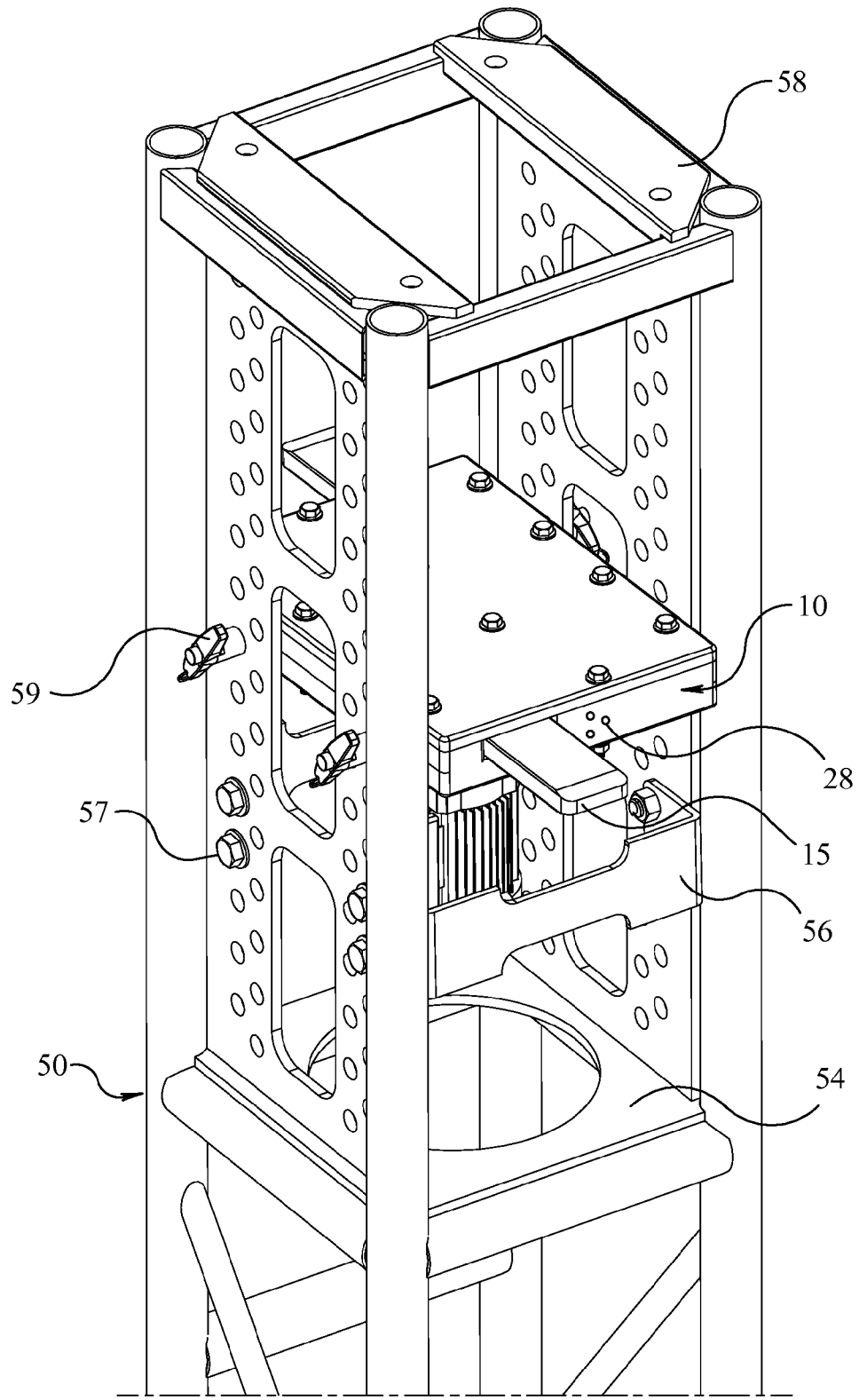
FIG. 4 is an upper perspective view of the tower. The sleeve is removed to show the details of the tower with lock mounting and the lock mechanism. The forks are shown extended which is the position when the sleeve is locked. The relative elevation of the mechanism in each tower is adjustable in small units by moving the quick release pins in the frame gusset plate holes.

FIG. 4 is an upper perspective view of the tower with lock mechanism. The sleeve is removed to show the details of the tower with lock mounting (50) and the lock mechanism (10). The forks (15) are shown extended which is the equivalent of locked. The diaphragm gusset (54) has a hole to allow the gearmotor to pass through. The lock mechanism (10) mounts to the frame gusset plates (55) of tower (50) using quick release pins (59). The relative elevation of the mechanism in each tower is adjustable in small units nominally one inch.

Figure 5:
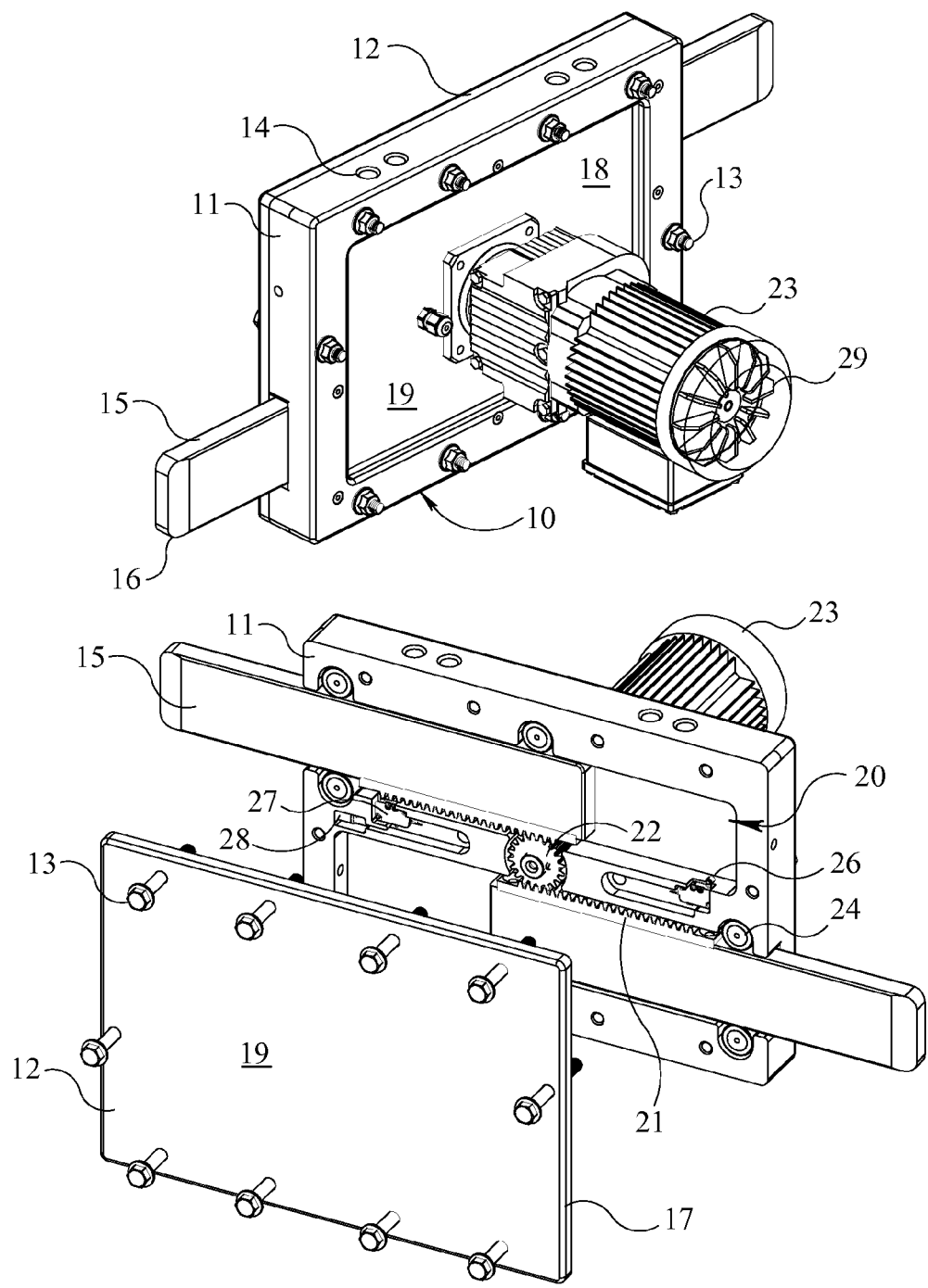
FIG. 5 is a rear and exploded upper perspective view of the lock mechanism. The tower lock mechanism is a sandwiched structural element with the gearmotor supported from below. The reciprocating forks are fitted with rack gears driven by the pinion on the gearmotor.

FIG. 5 is a perspective and exploded view of the lock mechanism. The tower lock mechanism (10) is a sandwiched structural element. The baseplate (11) supports the gearmotor (23) from below. The reciprocating forks (15) are fitted with rack gears (21). The gearmotor drives a pinion gear (22) which engages the racks. The forks are propelled horizontally and retained within their path of travel by cam followers (24). The rack gear (21) engages end of travel limits (26) and (27). The cover (12) is held into place by compression bolts (13). The edges of the cover (12) are machined with radius corners (17). The baseplate (11) is chamfered and filleted (17) to present a smooth surface to the technician's hands. The framework is treated with a corrosion resistive finish (19).

Figure 6:
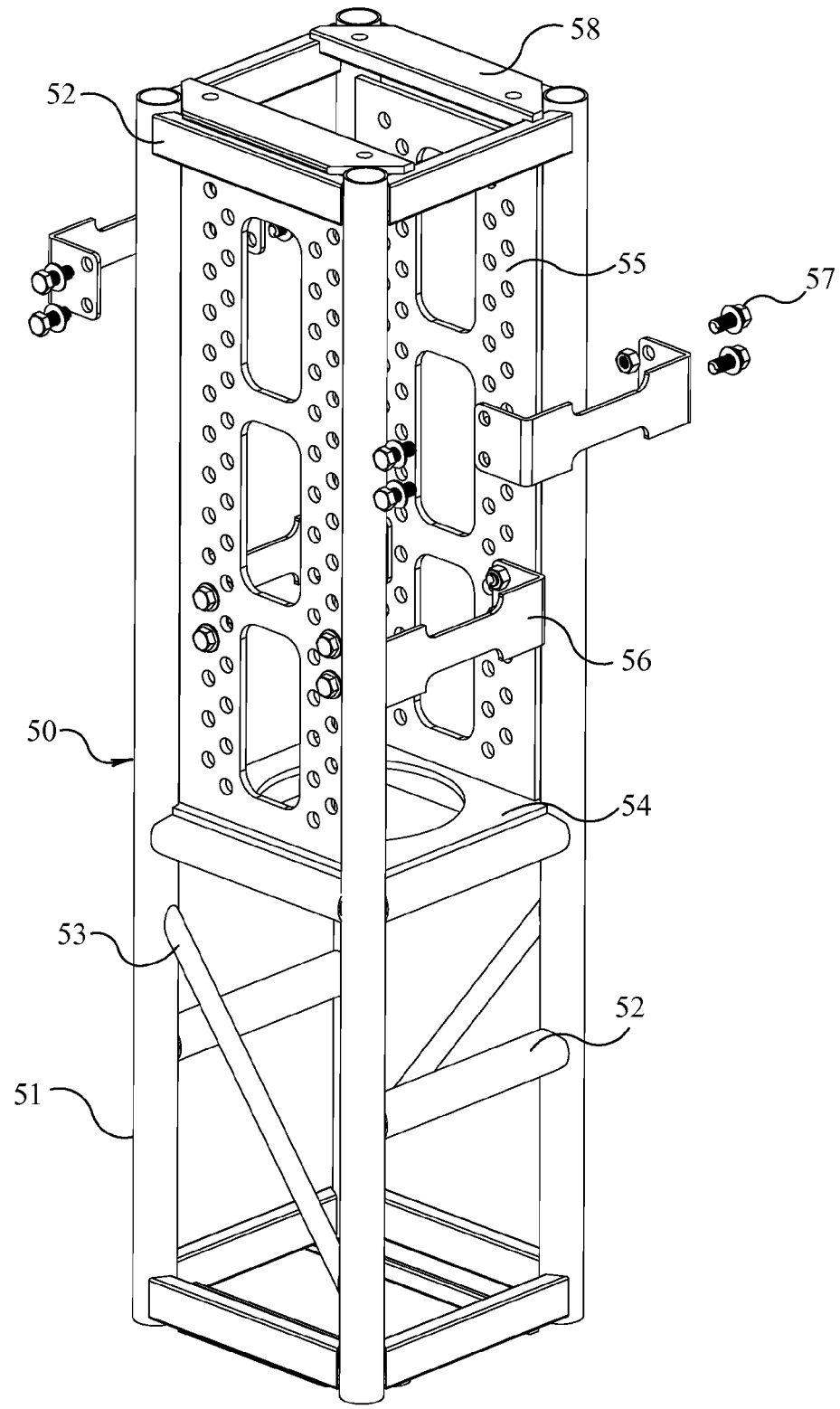
FIG. 6 is an exploded upper perspective view of the tower lock mounting. The truss is braced to allow two sides to be open for the extending forks. Adjacent to the open sides are frame gusset plates for supporting the lock mechanism. Four adjustable frames are located at one third points. The diaphragm gusset plate replaces internal diagonals and prevents racking.

FIG. 6 is an exploded upper perspective view of the present invention. The section of tower with lock mounting (50) is braced to allow two sides to be open for the extending forks. Adjacent to the open sides are frame gusset plates (55) that support the mechanism with two staggered rows of bolt holes. After the mechanism is located, four adjustable frames for open sides of truss (56) are located at one third points and installed using bolts and washers (57). The diaphragm gusset plate (54) replaces internal diagonals and is equipped with a passage hole for the gearmotor.

Figure 7:
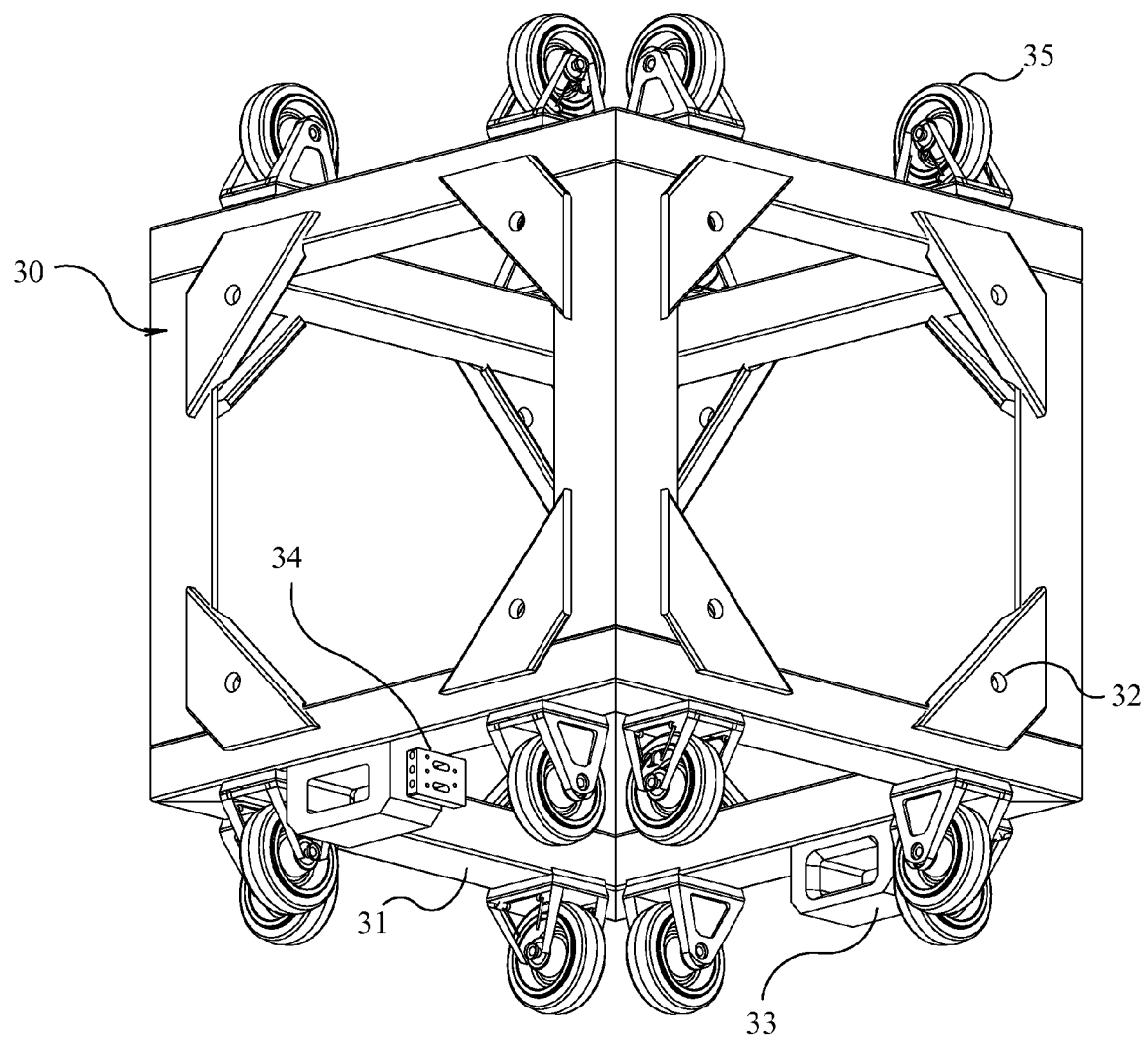
FIG. 7 is a lower perspective view detail of the sleeve block. The sleeve is equipped with stirrups to engage the locking forks. A sensor target is attached to one of the stirrups.

FIG. 7 is a lower perspective detail view of the sleeve. The sleeve block (31) is equipped with stirrups (33) at two or more locations. Attached to one of the stirrups is a sensor target (34) which triggers the proximity sensors (28) when the sleeve block with stirrups (30) is in alignment with the lock mechanism. The sleeve is guided by rollers (35) or sliding guides.

Figure 8:
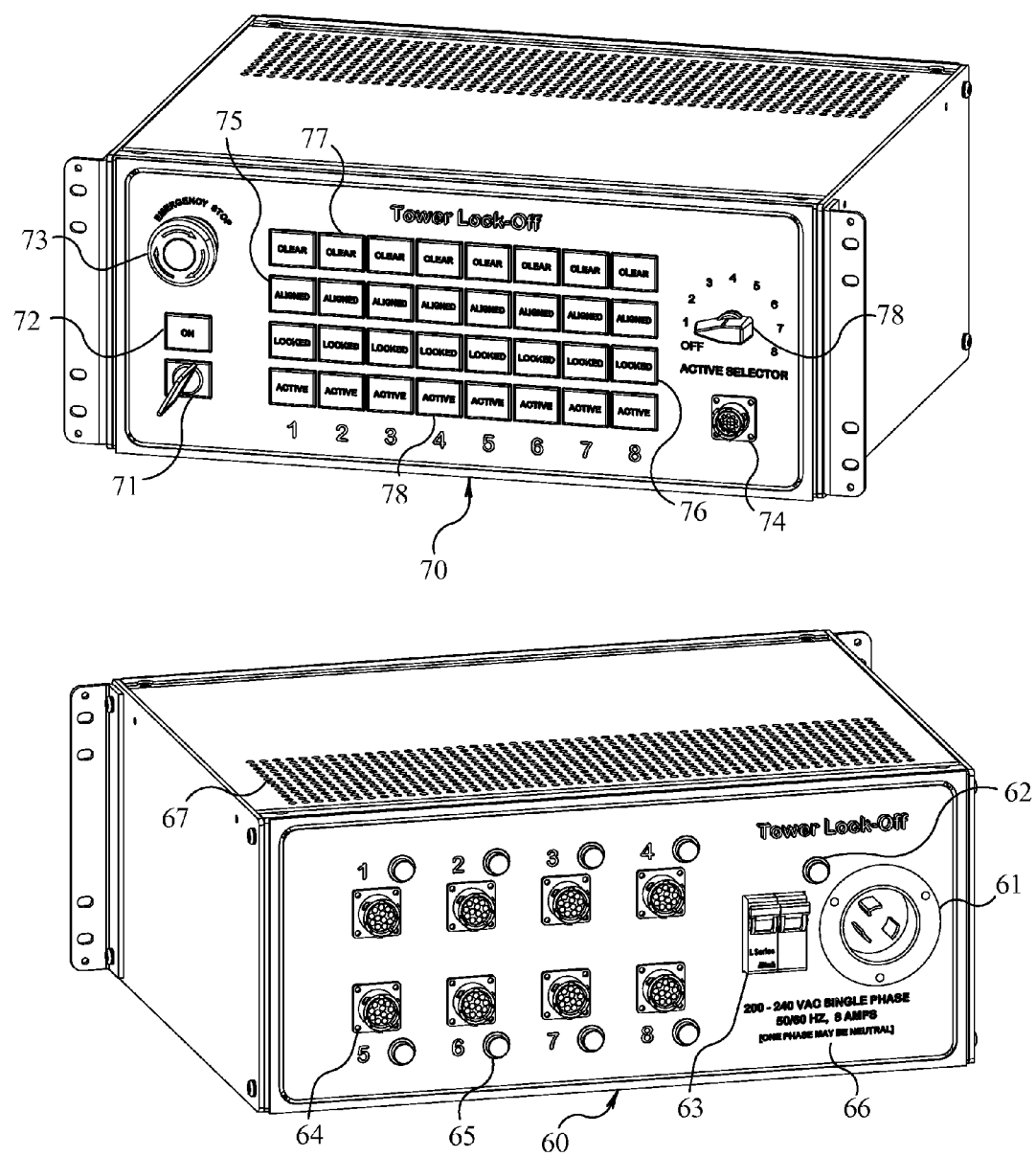
FIG. 8 is a front and rear view of the controller. Configured in an EIA 19" rack mount panel such that it can be mounted in rolling road show cases with removable front and rear covers. The rear panel is equipped with a power inlet and receptacles for channel control cables. The front panel is equipped with a power switch and a system of indicators for the numerous control channels.

FIG. 8 is a front and rear view of the motor controls. The controller is configured in an EIA 19" rack mount panel such that it can be mounted in rolling road show cases with removable front and rear covers. The rear panel (60) is equipped with a power inlet (61) that is protected by a 2-pole circuit breaker (63). Each channel of control has a multi-pin connector for power and control (64). When the circuit is complete from the controller to the tower Lock the loopback indicator (65) will illuminate.

The front panel (70) is equipped with a power switch (71), on indicator (72) and emergency stop operator (73). There are eight channels of controls in this configuration. Each has an aligned (75) clear (77) and locked (76) indicator that display the status of the limits at all times when the controller is energized. The active channel is selected by the rotary switch (78) that assigns control signals to and from the pendant that plugs into the receptacle (74).

Figure 9:
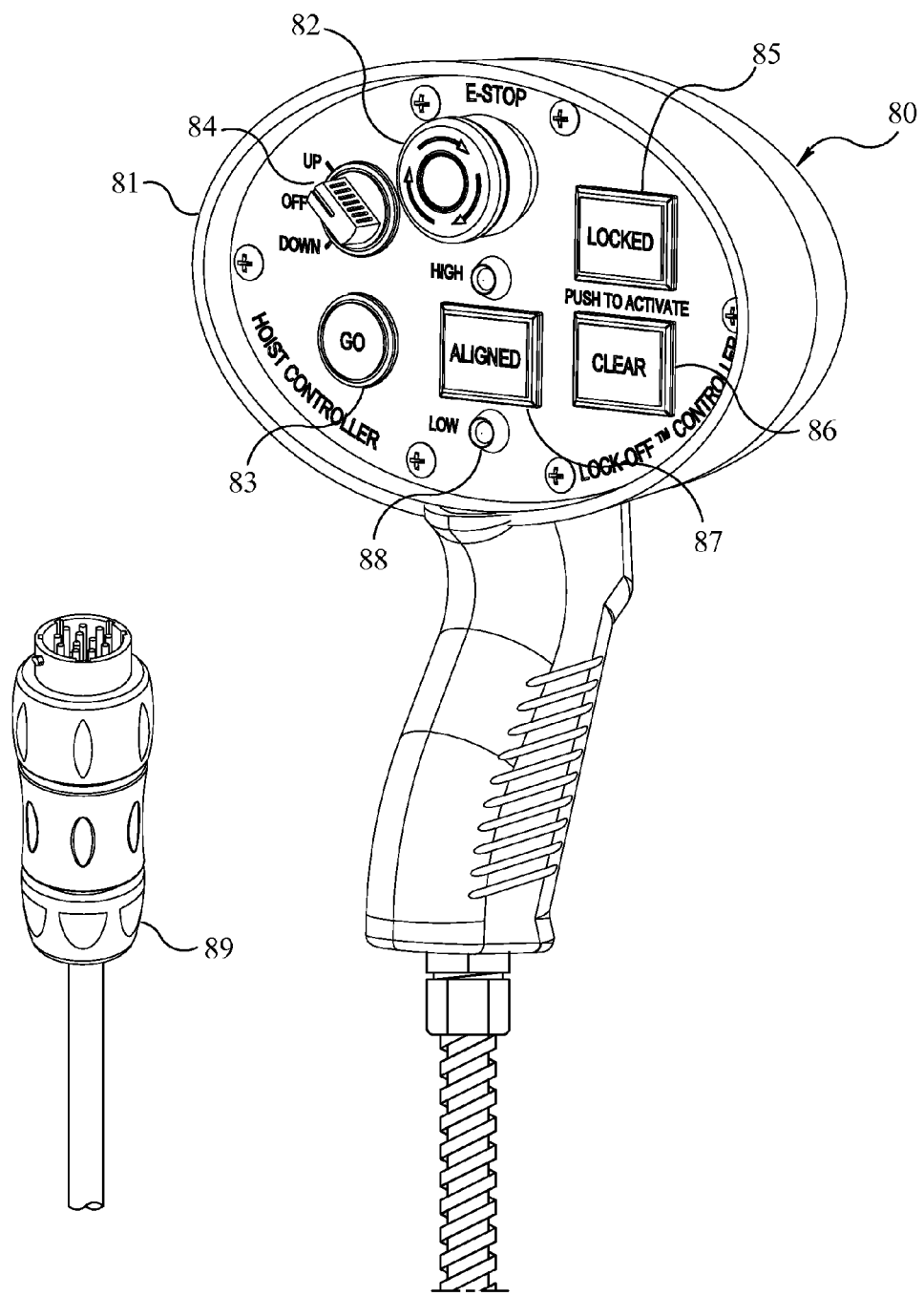
FIG. 9 is an overall perspective view of the control pendant. The enclosure is fitted with a pistol grip, control cable and multi-pin plug. The faceplate is equipped with indicators and operators for operation of the tower lock and the hoist system.

FIG. 9 is an overall perspective view of the pendant controller. The pendant enclosure (81) is fitted with a pistol grip and strain relief for the pendant cable. The cable of varying lengths is terminated with a multi-pin plug (89) that connects to the controller. The pendant (80) is equipped with an emergency stop operator (82). The locked (85), clear (86) and aligned (84) indicators mimic the indicators on the controller.

Figure 10:
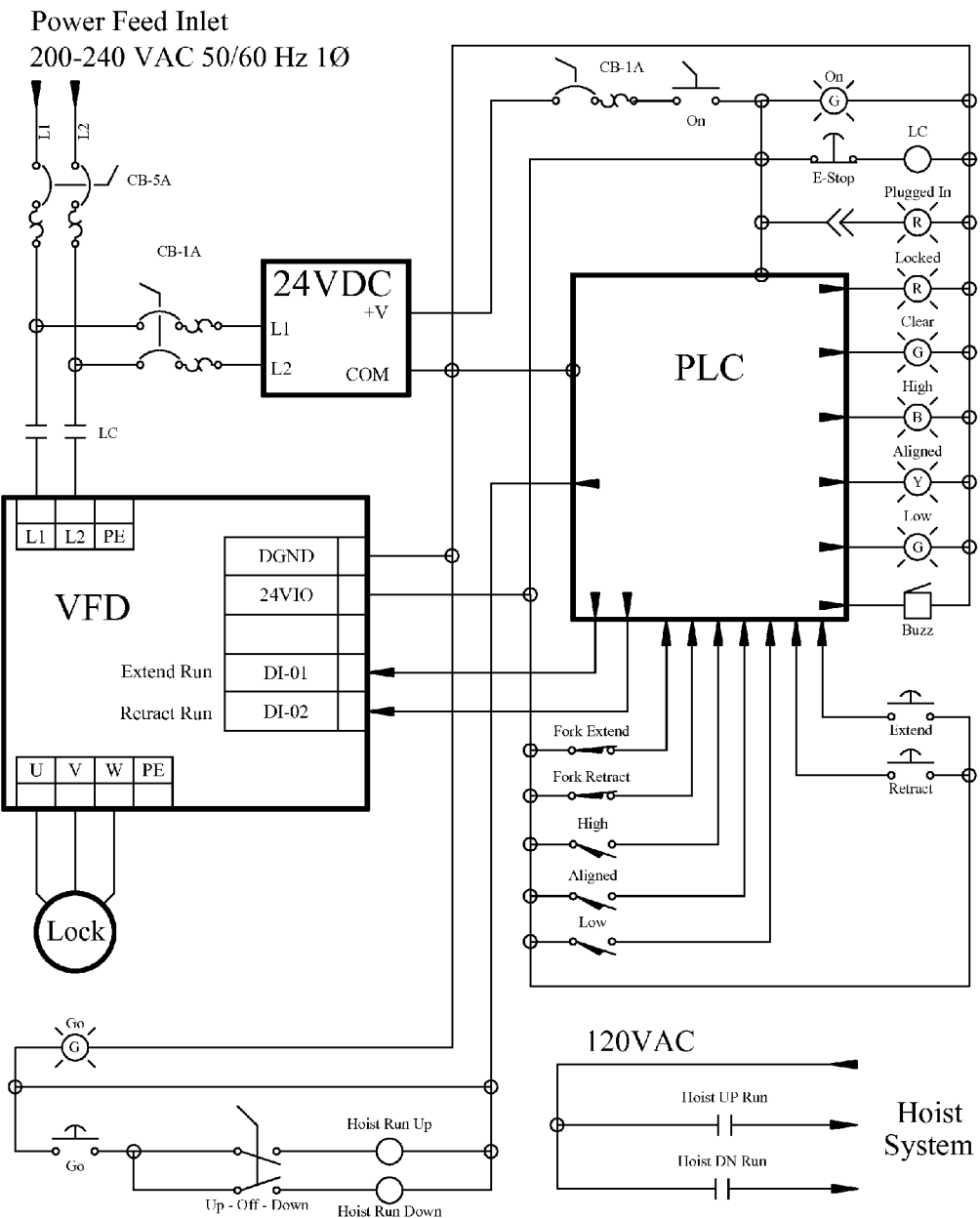
FIG. 10 is a schematic illustrating the overall controls for the lock and hoist system. The drawing of the control system depicts the primary components for a one channel system.

FIG. 10 is a schematic illustrating the overall controls functionality of the first embodiment. The drawing of the control system depicts the primary required components for a one channel system. The incoming power is protected by a thermal magnetic circuit breaker sized to protect the VFD. The power supply is tapped off of the mains and fitted with primary and secondary circuit protection. The power switch may be a keyswitch or toggle as deemed suitable. Energizing the system with the power switch provides power to the PLC logic, emergency stop system, and the VFD drive electronics. The monolithic power and control cable to the lock mechanism is fitted with a loopback which illuminates the plugged In light when the circuit is complete. The limit switches and position sensors are energized and feedback is reported to the PLC. The status of those sensors and limits is displayed by the illuminated indicators, some of which may also be a pushbutton. The emergency stop must be clear in order to set the line contactor that provides power to the VFD. When the locking forks are fully retracted, the Clear indicator illuminates. The hoist control Go lamp illuminates, allowing the hoist to be run in either direction. The hoist control is relay isolated from the 120 VAC controls that are inherent to the chain motor control system. As the hoist raises, the Low sensor is engaged. The Low indicator light illuminates and a bi-tonal annunciator chirps while it is tripped. The operator now bumps the hoist into position, detecting either the Aligned position or a slight overshoot with the High sensor. This triggers an alternate tone from the annunciator. When the hoist is aligned, it is possible to depress Locked and operate the locking mechanism. The end of travel limit switch stops the motor and indicates that the truss is locked. The Go pushbutton for the hoist is now illuminated indicating that the hoist can be bumped down to settle onto the stirrups and then the Low indicator will illuminate. Reverse operation is to raise the hoist to the Aligned position and then retract the forks until the Clear limit is engaged. At that point the hoist may be run up or down as desired.

A. Tower Lock Mechanism

The Lock Mechanism case consists of a structural housing baseplate (11) that is made from high strength and lightweight material. The housing becomes an integral part of the truss tower when it is located into the tower. The quick release pins (59) engage into bushing inserts (14) to provide long service life of the housing. The reciprocating lock forks (15) are machined from high strength alloy steel with profiles (16) to engage and disengage from the stirrups (33) in less than optimum conditions. The exterior and some areas of the interior are treated with a corrosion resistive coating (19).

The Tower Lock Mechanism (10) is comprised of structural elements with high strength to weight properties. The Structural Housing Baseplate (11) is machined from high strength aircraft alloy aluminum. The shape of the baseplate is optimized by thin sections (18) in locations where the additional material does not benefit the structural integrity. The perimeter of the housing has a radius or chamfer (17) at all locations to provide a smooth surface for hand contact.

The interior of the baseplate is milled for guiding the forks including roller and thin anti-friction bearings. Cutouts provide calibrated mounting surfaces for limit switches and position sensors.

The Structural Cover (12) for the housing baseplate is machined from aluminum and fitted with holes for compression bolts (13) that sandwich the housing together. The interior of the cover has a machined relief for active moving components.

The perimeter of the housing is equipped with mounting pin receptacles with bushing inserts (14). The receptacles are located on opposing sides to align with the tower mounting holes. The inserts provide a hardened surface for wear resistance from the frequent engagement of the pins.

The reciprocating locking forks (15) are machined from high strength alloy and stainless steel. The edges of the forks have radius (17) to prevent the steel from gouging the softer aluminum components. The tips of the forks are tapered and contoured (16) to allow for minor misalignment of the stirrups. The housing is treated and coated with hard anodizing (19) to prevent corrosion.

This embodiment is based on an aluminum frame for the lowest weight and highest strength in a modest price. Alternate variations manufactured from formed and welded cold rolled steel plates are envisioned for high strength with less consideration to weight. This would be most common in a non-touring variant. The use of exotic alloys such as titanium and composites such as carbon fiber may be relevant for particular iterations related to nautical, aerospace or military applications. Perimeters with angular formed sides provide an alternate method for mounting where bolts and locking nuts are used to secure the mechanism to the Tower with lock mounting.

Variants include forks extending in two directions for a 90 degree corner, three directions for a Tee, and four directions 90 degrees apart for a central column. Locking forks may be stacked in parallel planes using pinions driven by the common gearbox shaft.

This embodiment is based on the prevalent square column truss. The use of a triangle, rectangle, pentagon, hexagon, octagon, round or other shape tower would provide for variances in the number and locations of locking forks.

B. Tower Lock Mechanism Interior

The interior of the lock mechanism (20) is a system of guides and slides for the forks. At thrust points the forks are captivated by cam followers with roller bearings (24). Above and below the forks are anti-friction surface bearings (25) of bronze and UHMW plastic. The forks are fitted with rack gears (21) that are operated and synchronized by a pinion gear (22). The pinion is turned by an electric gearmotor (23) with a high internal ratio. The case is machined for mounting of the fork retracted limit switch (26) and fork extended limit switch (27). The side of the case is machined to house the sleeve alignment sensors (28). The gearmotor is equipped with a fan wheel (29) for operation without power.

The reciprocating forks (15) are propelled by rack gears (21) which are mounted to the forks. The forks are driven by a pinion gear (22) mounted onto the output shaft of an electric gearmotor (23). The gearmotor is of sufficient reduction to provide a complete one direction cycle of the mechanism in 5 seconds. The forks are guided by Cam Follower roller bearings (24) that laterally brace and guide the forks and the rack gears into the pinion gear. The interior of the housing (11) is equipped with thin anti-friction bearings (25) for the forks to slide upon. When the forks are fully retracted, they shall engage a Fork Retracted end of travel limit switch (26). Striking this switch shall stop further rotation of the gearmotor in this direction and signal via control logic that the forks are clear. When the forks are fully extended, they shall engage a forks extended end of travel limit switch (27). Striking this switch shall stop further rotation of the gearmotor in this direction and signal via control logic that the forks are locked. The fork to stirrup alignment sensors (28) detects the position of the sleeve and stirrup receptacle. The sensors signal the operator that the sleeve is low, aligned, or high for the engagement and retraction of the forks.

The gearmotor is fitted with a removable guard that exposes a fan wheel (29) that allows the motor to be rotated without power.

The forks in this embodiment extend and retract in a linear fashion. The forks in alternate configurations might extend by a rotating or swinging motion with the pivot point either in the horizontal or vertical plane. The motion of the forks may be coordinated or independent from each other. The forks in this embodiment are designed to be thin and wide in order to fit within the housing. There are specific advantages to forks which are tall and thin and would be used in various alternate configurations. The forks in some cases may be round pins, fitted with a bullet shaped nose. The forks may be propelled via gearing or levers which translate motion along a straight or circular path. Levers may be rigid or made of flexible media including wire rope or roller chain. The rack gears may be machined into the surface of the locking forks.

The motive force in this embodiment is a fractional horsepower electric gearmotor which uses a spur pinion gear on its output shaft to drive a rack gear mounted onto each of the forks. The use of electricity to drive the motor is merely a convenience in so much as that other aspects of the lifting system are also powered by electricity. Systems may be similarly powered by hydraulic motors or pneumatic motors.

The use of a gearmotor is one embodiment to transition rotary force to horizontal motion. Linear actuators, hydraulic cylinders and pneumatic pistons may also be used to propel the locking forks into position.

Kinetic energy in the form of springs or dashpots may be used to extend, assist, retard, or retract the motion of the forks. In some configurations, the motive force to extend or retract may be gravity, with operation in the opposing direction powered by one of the previously described methods or even the moving load itself.

Small systems may be powered by halyards, endless chain, extension cranks, or other mechanisms which are manually powered.

C. Sleeve with Stirrups

The sleeve block (31) is the rolling (35) or sliding structural element that is engaged with the tower track system (51). The sleeve is fitted with nodes (32) for the attachment of any number of types and sizes of horizontal truss elements. The bottom of the sleeve is fitted with two or more stirrups (33) which are engaged by the locking forks (15). The stirrup receptacle provides a landing platform for the sleeve on top of the fork and a socket receptacle to limit up lift. Attached to one or more of the stirrups are targets (34) for the alignment proximity sensors or limit switches (28).

The rolling or sliding sleeve block (30) is fitted with truss mounting nodes (32) for the horizontal truss elements. The rolling or sliding sleeve block (30) is fitted with stirrups (33) that provide a receptacle for the locking forks (15) to engage. The stirrups provide a reinforced surface for the forks to scuff and a surround component to prevent upwards travel of the sleeve. The sleeve and stirrup are equipped with a target (34) appropriate for the sensor technology incorporated in the locking mechanism. When the hoist for the sleeve block aligns the target with the sensor, the control system is signaled that the correct position for docking has been achieved. Extension or retraction of the forks is only possible when this sensor is enabled.

The construction of the sleeve block is a function of the particular type, style and manufacture of towers and associated components. The dominant style of truss towers are square box with sleeves that surround the tower and are guided by wheels or UHMW plastic sliding surfaces. Towers that are triangular or hexagonal are particularly appealing when the truss to be hoisted does not layout with neat 90 degree corners.

The location of the stirrups favors below the sleeve block because the load is in compression and visually accessible. In a height constrained configuration, it could be advantageous to locate the stirrups at the top of the sleeve and essentially hang the sleeve when it is in the locked-off position. Some sleeves may hang on only one side of the tower, essentially using one side as a track system.

It is also possible for the stirrups to be somewhere in the interior or center of the sleeve. A vertical series of stirrup receptacles may be provided in order to allow for an alternate high trim location.

D. Truss Components Arranged for Lifting

The truss components are arranged for lifting (40) in the form of angles, tees and crosses around numerous columns (41). Near the top of each column is a section of tower with mounting (50) that is equipped with mounting holes arrayed for adjustment (55). The sleeve (30) travels vertically along the tower and is guided by wheels (35) or shoes. The chain hoist lifting mechanism (46) connects to a lifting bracket (42) by means of deck chain with shackles (49). The lifting chain (47) follows the path up to the sheaves (45) and across the rollerbeam or headblock (44). The chain continues down and attaches to lifting point bracket (48) connected to the horizontal truss elements (43). Within the tower with lock mounting (50) the lock mechanism (10) is located into place.

Standard truss and truss tower components are modular in nature and designed for touring, truck pack and versatility in their assembly. Each modular section is reasonably lightweight, oftentimes less than 100 pounds per section. Most sections are 2½ to 12 feet long, but all sizes and lengths are possible. The sections are connected together in two general fashions, using plates that bolt together or spigots and sockets which interlock using sexed connectors. It is practice not to mix sections of truss from different manufacturers.

A section of truss is designed for a horizontal installation. Truss tower sections are designed and braced for vertical installation and compression loads. The standard components required to assemble a truss tower are a suitable baseplate and sections of truss tower (41) to achieve the desired height. Many systems use a hinged section of tower at the base to assist with the erection of the tower.

A sleeve block (31) is a device which fits around the tower and provides nodes for attaching horizontal sections of truss (43), usually in 90 degree increments of rotation about the tower. The sleeve rolls or slides and uses the tower as its guide system.

The most frequent prime mover is an electric chain hoist (46), configured in an inverted fashion whereby the lifting chain exists the hoist and goes up towards the top of the tower. The chain rolls over a special grooved pulley referred to as a head block or roller beam (44). For spacing purposes, there are often more than one sheave in the assembly. The chain returns down to the horizontal truss and connects to a lifting point (48) and two-parts the hoist system.

The Tower with Lock Mounting (50) replaces one of the tower sections near the top of the tower. The sleeve with stirrups (30) replaces the standard sleeve (31).

The use of a single or multi-part chain, roller chain or wire rope are all possible for hoist the sleeve or truss.

It is possible that the truss tower will not be vertical but some angle to the horizon including horizontal.

The design and manufacture of truss and towers will evolve over time. The preference will likely continue to be weldments of aluminum due to its light weight and high strength. New extrusion profiles will proliferate, and the use of robotic welding and jigs will allow more complex shapes than the common box to be explored. Main chords with integral profiles for tracks accommodating enclosed wheels or guides is envisioned.

E. Tower with Lock Mounting

The tower with mounting for the lock mechanism (50) is equipped with end connection plates (58) or spigots in alternate embodiments. This tower section is open on two sides for the movement and adjustment of the lock mechanism (10) and clearance for the reciprocating forks (15). The mechanism is secured by quick release pins (59) that penetrate the holes in the frame gusset plate (55). Adjustable frames (56) are secured at one third points to the gusset plate by bolts (57). The diaphragm gusset (54) connects to the horizontal cross members (52) to prevent racking.

The tower with lock mounting (50) is installed at the high trim for the sleeve block (30). The truss is composed of standard tubular chords (51) to match the tower sections above and below. Horizontal round or rectangular cross-members (52) are located at the ends and frame the center of the module. A diaphragm gusset (54) prevents racking and is equipped with a clearance hole for the gearmotor to pass. Diagonal braces (53) are located between the chords in the lower section.

The upper section of tower provides 30 inches of adjustment for the locking mechanism (10). Two opposing sides of the tower have no fixed horizontal members over a 36 inch vertical span. The two opposing sides that are 90 degrees opposite are fitted with heavy gusset frames (55) with mounting holes. These plates are welded between the chords and fitted with lightening cutouts that create ladder rungs.

Each of the two open sides of the truss tower are equipped with a pair of adjustable frames (56). After the elevation of the Tower Locking Mechanism (10) is established, these frames are securely bolted into place to prevent spreading, compression, or twisting of the tower chords. The locking mechanism (10) is pinned into place by quick release pins that provide a shear strength and retention.

The quick release pins may be interchanged with bolts or clevis pins with hitch pins. Cam style fasteners may be used that insert and turn partial rotation to engage and hold. A perimeter ledge of angle or bar may be used, capable of supporting dominate downward force. All of the previously described methods in addition to clamps may be used to prevent upward movement.

F. Control Enclosure Rear Panel

The control enclosure rear panel (60) is fitted with all of the electrical connections between the controller and the locking mechanism (20). The power inlet (61) facilitates the use of a removable power cable such that various worldwide power combinations per the label (66) may be used. A power status indicator (62) illuminates when both lines are connected and the circuit breaker (63) is turned on. Each channel is equipped with a combined power and control multi-pin receptacle (64). When the multi-pin cables are connected between the controller and the lock mechanism (20) a loopback circuit confirms by illuminating the indicator (65). The enclosure is ventilated by convection or fans using holes (67).

The Control panel is comprised of an EIA 19" rack mount device for mounting within a standard rolling ATA case with removable front and rear cover panels. The rear panel (60) is equipped with a power inlet connector (61) with the ratings for AC voltage appropriate to the geographical area of use. Adjacent to the inlet is a voltage label (66) that identifies the electrical requirements for the system. A power status Indicator (62) will consist of one or more neon indicators to display the presence of required electrical power and diagnose possible connection problems. The power inlet will be protected by a circuit breaker (63) that interrupts all poles including neutral if used. The remainder of the rear panel is used for channel connection receptacles (64). Each receptacle provides motor power, low voltage control, ground and loopback signals in a single receptacle. Each locking mechanism is equipped with a lock power and control cable (68). A loopback Indicator (65) confirms the control circuit is complete from the control panel to the locking mechanism.

The control panel, particularly of smaller systems, may be designed such that the connectors described on the rear panel are located on the side panels or even the front panel. Panels of this size may hand carried and laid on their back during operation.

G. Control Enclosure Front Panel

The front panel of the controller (70) is equipped with a power switch (71) that energizes the panel. Confirmation of power is indicated with the on indicator (72). The emergency stop operator (73) in combination with its controller (93) remove all line voltage power from the motor controls when engaged. The emergency stop operator is released by twisting and allows the system to be reset. This embodiment is configured with eight channels of controls and indicators. Alternate embodiments may have more or fewer channels. As the quantity of channels increases, the more likely a PLC with a display screen will replace the indicators. The active indicator (78) illuminates to display which channel is assigned to the pendant controller (80). The aligned indicator (75) illuminates when the fork to stirrup sensor (28) is aligned with the stirrup target (34). The clear (77) and locked (76) indicators display the status of the fork position limits (27) and (28). It is possible for neither to be illuminated indicating a transitional phase. The use of a PLC allows flashing indicators or HMI screens to explain the ambiguous condition. The active channel selector (78) assigns the pendant (80) to the desired channel. The pendant plug (89) is inserted into the receptacle (74).

The front panel of the enclosure (70) is equipped with a power switch (71), illuminated power on indicator (72), and emergency stop system. The emergency stop operator (73) interrupts the line voltage power to the system. It does not interrupt the low voltage power such that the various status indicators can continue to be monitored. The channel alignment indicators (75) and locking fork extended (76) and locking fork retracted (77) all function whenever the power is on. The active channel selector (78) is used to assign the pendant (80) to the controller. The active Indicator (79) illuminates to show which channel is currently assigned to the controller and the pendant operator.

Larger systems may be equipped with a pendant that monitors and controls multiple channels at one time. This would likely entail an HMI with a GUI graphical user interface. This screen may also be a touchscreen allowing for the reduction of pushbutton operators and electrical conductors in the pendant cable. Input and output signals may allow this system to be operated by a supervisory motion control system for the hoists.

H. Remote Pendant Controller

The pendant (80) is the basic point of operation for the tower locks. The control cable is of sufficient length for the operator to move about the stage and observe the operation of the locks. The emergency stop (82) releases the line contactor and prevents all motion. The aligned indicator (87) illuminates to indicate the position of the sleeve and that operation of the locks is possible. The locked indicator-operator (85) commands the lock to extend the forks. End of travel is indicated by the illumination of the Locked indicator. The clear indicator-operator (86) commands the lock to retract the forks. End of travel is indicated by the illumination of the clear indicator (86). The hoist is operated by the hoist go operator (83). The direction of travel is selected by the up-off-down Selector (84). The position of the sleeve relative to the lock is shown by the high and low indicators (88) and the aligned indicator (87).

The remote pendant (80) control cable and plug (89) inserts into a receptacle (79) that is located on the front panel (70). The pendant enclosure (81) is a pistol-grip enclosure with protective bezel and strain relief for the control cable. The pendant is equipped with an emergency stop operator (82). The act of plugging the pendant into the receptacle adds the pendant emergency stop in series with the front panel emergency stop. The channel locked operator (85) illuminates when locked. The channel clear operator (86) illuminates when clear. The channel aligned indicator (87) illuminates when operation of the locking forks in either direction is possible. The hoist up-off-down selector pre-selects the direction of the hoist. The go hold to run operator enables the hoist.

The control system as described allows for the operation of one hoist and tower lock-off from a pendant. This is satisfactory for small systems or initial set-up, but cumbersome for larger applications. The inclusion of a PLC instead of relays to handle the logic allow flashing indicators to signal ambiguous conditions, such as the transition between locked and clear. In addition annunciators with buzzers or even voice alarms are possible to draw the operator's attention when necessary. A touchscreen GUI will considerably reduce the number of discrete pushbutton and lamp circuits. The serial communication of a GUI will allow multiple channels to be selected for simultaneous operation. The use of wireless technology would allow freedom of movement without the cord and plug assembly for the pendant. Further use of wireless technology will allow the tower locks to be operated via wireless controls for the limit switches and position sensors. This in combination with battery operation could allow the locking mechanism to be installed without any cables.

I. Control Logic

The input power required is 200 to 240 VAC at 50/60 Hz. The power may be single phase line to neutral, single phase line to line, or two phases from a three phase system. Alternate embodiments may operate at 110 to 120 VAC or 380 to 480 VAC. Additional embodiments may operate using low voltage DC or batteries at 12 to 48 VDC for motor power. The controller is equipped with a two pole circuit protection breaker (91). When power is present and the breaker is on the low voltage power supply (92) will be energized. This may be either AC or DC low voltage. The power switch shall energize the system to provide control voltage to the Emergency Stop system (93) and the control electronics of the VFD motor controller (94) and the PLC logic system (95). The alignment position circuit (96) and limit switch feedback circuits (97) are energized and report to the PLC and indicators on the front panel (70). The emergency stop system verifies the integrity of the conductors between all emergency stop pushbutton operators (73) and (82) in the system. When the operators are not depressed, the system shall be reset. Force guided relays within the emergency stop controller shall energize the line contactor and provide line voltage power to the VFD motor controller. The channel selector (78) shall assign the pendant to the desired channel of operation. The status of all limit switch circuits may be monitored and processed by an interlock system to the tower hoisting system (99).

The line voltage Input of the system is designed to operate on worldwide voltage and frequencies. Particular systems may be optimized to operate in a particular country or region, but the primary system does not set that limitation. The Input Power is 200 VAC to 240 VAC, single phase, 50/60 Hz, 5 amps per active channel. The voltage may be 2 phases of a 3 phase, system, 2 lines of a single phase system, or a line and neutral of a single phase or 3 phase system. For this reason, both incoming power conductors are protected by a 2-pole circuit breaker for input power protection (91). The third conductor is chassis ground. The protected power is routed to a line contactor and the Line feed of a 90 V-264 V universal primary DC switching power supply. The low voltage power supply (92) provides 24 VDC for operation of the controls. The output of the power supply is switched by the Off-On keyswitch. The emergency stop system (93) monitors the status of the normally closed NC contacts of the emergency stop operator. Each operator is equipped with dual NC contacts and a NC contact and illuminated indicator for signaling when depressed. When the emergency stop circuit is satisfied, it can be reset which latches a force-guided relay. The NO contacts of the relay energize the coil of the line contactor that in turn provides line voltage power to the VFD. The VFD is the motor controller and overload protector (94) and is supplemented with binary logic inputs.

When the power is turned on, 24 VDC is sent to each locking mechanism. There are 6 return signals: loopback, aligned sensor, high sensor, low sensor, fork retracted limit, and fork extended limit. The loopback circuit is completed simply by plugging a cable into the back of the controller and the opposite end into a locking mechanism. An LED indicator adjacent to the receptacle on the rear panel of the controller confirms the completed circuit. The alignment sensor circuit (95) detects that the target is within range of the proximity sensor. Unlike most limits, this sensor is NO and sets a high=good signal. The limit switch end of travel limits (96) are NC and provide a high=good signal to the binary inputs of the PLC. Normally each channel of control would have their own VFD and the operation of multiple channels simultaneously would be allowed. An interlock circuit to the hoist system (99) may be provided by monitoring the aggregate of all channels retracted limit switch. Any switch would prevent the all clear signal being passed to the hoist controller.

The control system described uses basic relay ladder logic to control a reversing contactor or variable frequency controller VFD. Due to the method of use that requires frequent disassembly and reassembly of the system, a robust simple to diagnose system is desired. The system is required to function in the elements with temperatures ranging from −10 C to +50 C. The addition of a GUI graphical user interface would allow for more intuitive displays of information. Flashing indicators and audible alerts could be integrated into the controls.

J. Connections of Main Elements and Sub-Elements of Invention

The structural housing baseplate (11) and structural housing cover (12) provide a structural envelope for all of the components comprising the tower lock mechanism (10) and (20). The entire mechanism is mounted into tower with lock mounting (50) at the adjustable location required. The four quick release pins (59) engage the frame gusset plate (55) and insert into the Mounting pin receptacles (14). After the Lock mechanism is located, four adjustable frames (56) are installed into the tower. The frames are located in zones approximately 12" apart with the lock mechanism (10) being included in the calculations. The frames are attached using the bolts (57) which are snug tight.

The lock power and control cable is routed inside of the truss tower with its female receptacle connecting to the power inlet on the locking mechanism. The opposite end of the power and control cable plugs into the designated channel receptacle (64) on the control enclosure rear panel (60). The power input cable which is equipped with a plug matching the local power supply, is connected to the power inlet connector (61). The pendant cable plug (89) is connected to the remote pendant receptacle (74). The tower is assembled with the sleeve with stirrups (30) engaging the tower, and rotated such that the stirrups (33) are in the plane of alignment for engaging the reciprocating lock forks (15) when the tower is tilted into its vertical position. The sensor target (34) must be oriented such that it will activate the fork to stirrup alignment sensor (28).

K. Alternative Embodiments of Invention

The embodiment described in the figures and descriptions is based on the locking forks being part of the fixed tower and the receivers for the forks being part of the moving sleeve block. The locations of these component may be reversed.

The design and manufacture of truss and towers will evolve over time. The preference will likely continue to be weldments of aluminum due to its light weight. New extrusion profiles will proliferate, and the use of robotic welding and jigs will allow more complex shapes than the common box to be explored. The use of these profiles with tracks for enclosed wheels or guides is envisioned. Larger structures will incorporate a ground based hoist with the lifting media traveling through the tower up to the head block. Other lifting systems may employ rack and pinion to climb the tower chords. As the size of the sleeve block increases, it is possible and even preferable for the locations of the components to invert. The locking forks and their drive system becomes part of the sleeve block, where the stirrups or locking receptacles become part of the tower.

L. Operation of Preferred Embodiment

A climbing ground support truss system consists of one or more towers equipped with a hoisting mechanism. The majority of systems are raised by a chain motor system, although cable and alternate climbing arrangements are possible. The most common truss towers have a rolling or sliding sleeve which acts as a connecting node for horizontal truss members that connect to additional towers at their sleeves. The chain hoist motor is attached near the sleeve to a horizontal section of the truss, and the chain extends up to the top of the tower. At the top of each tower, a device known as a roller beam or headblock is equipped with special pulley sheaves that are grooved to accommodate chain. The chain passes over one or more sheaves and returns to another section of the horizontal truss or the sleeve. This configuration is known as 2-part reeving.

When the load is raised into position, the sleeve which travels along the truss must be locked-off at its high trim position. This must be done to secure the load if one of the hoisting chains were to break or the brake or clutch were to slip. In most cases, it must also be done because secondary hoists will add more load to the roof structure than the primary hoists can support. In addition, there is the possibility of wind gusts that would lift the tent canopy, actually raising the truss higher, and then dropping it which could shock load and break the lifting chain.

Therefore, with the addition of wind, rain, or snow, the lifting chain motor does not have the capacity to hold the amount of load that will be suspended from the roof truss. The load must be transferred to the tower via the locking method.

The purpose of this invention is to provide a remotely operated locking system for truss towers. The lock-off is installed in the upper regions of the truss tower before it is tipped up. The special tower section is equipped with adjustment holes 1 inch on center over a 30 inch range. When the towers are assembled at ground level, a transit style laser is used to establish the height of each truss at the hinge block. Using those readings, the lock-off mechanism is located at the exact elevation required before it is raised into position. A combined power and control cable is routed from the lock-off mechanism through the center of the tower.

The truss and roof tent is assembled and raised into position via chain motors using the normal procedure. The roof operator bumps the truss into final position, such that the stirrups located on the sleeve are in line with the red forks on the lock-off mechanism. Systems may have sensors or limit switches that indicate at the controller that the stirrup is low, aligned, or high. When all stirrups are aligned, the forks are extended via electrical operation which takes approximately 5 seconds per tower. The locking forks are equipped with a limit switch that indicates that the fork is fully extended and prevents overtravel. The roof operator lowers the truss to rest onto the lock-off mechanism, known as slacking the chains. This effectively transfers the load center of gravity an average of 6 feet lower onto the tower than systems rigged the traditional method.

In the case of a "Wind Action", the lighting, video and audio loads are lowered to the deck. The roof operator bumps his chain motors to lift the roof off of the stirrups. The forks are retracted, and then the roof is lowered. This process did not require any stagehands to climb the towers.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Any headings utilized within the description are for convenience only and have no legal or limiting effect.

INDEX OF ELEMENTS

10: Tower Lock Mechanism
11: Structural housing baseplate
12: Structural housing cover
13: Structural housing compression bolts
14: Mounting pin receptacle with bushing inserts
15: Reciprocating lock forks
16: Tapered and contoured fork ends
17: Radius corners and chamfered edges
18: Section relief
19: Corrosion resistive coating
20: Tower Lock Mechanism Interior
21: Rack gears
22: Pinion gear
23: Electric gearmotor
24: Cam follower bearings
25: Anti-friction surface bearings
26: Fork retracted position limit switch
27: Fork extended position limit switch
28: Sleeve alignment sensors
29: Manual operation fan wheel
30: Sleeve With Stirrups
31: Rolling sleeve block
32: Truss mounting nodes
33: Stirrups for fork engagement
34: Sensor target
35: Rolling caster guides
40: Truss Components Arranged for Lifting
41: Standard truss tower of modular length
42: Truss lifting bracket
43: Horizontal sections of truss
44: Headblock or roller beam
45: Chain sheaves
46: Chain hoist lifting mechanism
47: Lifting chain
48: Lift point bracket
49: Deck chain with shackle
50: Tower With Lock Mounting
51: Round tubular chords
52: Horizontal round and rectangular cross-members
53: Diagonal bracing
54: Diaphragm gusset
55: Frame gusset plate with mounting holes
56: Adjustable frames for open sides of truss
57: Bolts for adjustable frames
58: Truss end connection plates 59: Quick release pins
60: Control Enclosure Rear Panel
61: Power inlet connector
62: Power status indicator
63: Power inlet protection circuit breaker
64: Receptacles for channel power and control
65: Loopback indicator
66: Voltage label
67: Enclosure ventilation
68: Lock mechanism power and control cable
70: Control Enclosure Front Panel
71: Power switch operator
72: Power on indicator
73: Emergency stop operator
74: Control pendant receptacle
75: Channel alignment indicators
76: Channel locked indicator
77: Channel clear indicator
78: Active channel selector
80: Remote Pendant Controller
81: Pendant enclosure
82: Emergency stop operator
83: Hoist go operator
84: Hoist up-off-down selector
85: Channel locked indicator and extend to lock operator
86: Channel clear indicator and retract to clear operator
87: Aligned indicator
88: High and low indicators
89: Pendant plug and cable
90: Control Logic
91: Input power protection
92: Low voltage power supply
93: Emergency stop system
94: VFD motor controller with overload protection
95: PLC logic system
96: Alignment Sensor circuits
97: Limit switch feedback circuits
98: Hoist and lock control operation
99: Interlock and operation circuit to hoist system

What is claimed:

1. A system for locking horizontal truss members at a vertical position along an upright truss tower comprising:
    a length of truss tower and a mounting section attached to the top of the truss tower, configured in the same shape and dimensional size of the tower;
    a rolling or sliding sleeve for attachment of horizontal sections of truss arrayed about a centroid of the sleeve;
    a hoisting system, consisting of a powered hoist to raise a sleeve block from a working height to a high trim position;
    a power actuated locking mechanism, attached to the inside of the mounting section, having extendable locking forks;
    and a control system with a power section, logic control section, and human interface;
    wherein the locking mechanism, upon activation, extends the locking forks out of the mounting section to lock the sleeve in a vertical position.

2. The system of claim 1, further comprising:
    said tower section and said mounting section including horizontal members that space and hold a plurality of vertical chords parallel to each other;
    a gusset member to hold the plurality of vertical chords aligned relative to each other;
    said truss tower and mounting section to be fitted with diagonal members about the perimeter of the tower that reinforce the chords in pairs by means of a triangular pattern;
    said mounting section to be void of diagonals at an upper portion to allow for mounting frames on two opposite sides, and for accommodation of the locking forks on the remaining two opposite sides;
    said gusset member comprising a plate having holes in symmetrical rows and columns for the attachment of the locking mechanism;
    a plurality of structural frames repositionable by threaded fasteners at locations above and below the lock mechanism, for the purpose of bracing the vertical chords from spread, collapse and twist.

3. The system of claim 2, wherein the spacing of said holes in said gusset plate provide a gradient of adjustment for the relative elevation of the lock mechanism;
    the gradient of adjustment being scalable relative to the physical size of the truss and the span.

4. The system of claim 1, wherein the extendable forks secure the rolling or sliding sleeve and mounting section in such a fashion as to prevent the sleeve from traveling upwards or downwards when locked.

5. The system of claim 4, wherein when the rolling or sliding sleeve is locked to the mounting section the hoisting system is allowed to be slack.

6. The lock mechanism of claim 1, wherein the extendable forks engage a receptacle on the rolling or sliding sleeve;
    the engagement of the fork into the receptacle captivates the sleeve and resists a twisting action of the horizontal truss and sleeve.

7. The lock mechanism of claim 1, further comprising a manual operating system that does not require power for testing the mechanism during assembly and affords manual deployment without power for emergency operation if an electrical component fails.

8. The system of claim 1, wherein a relative motion of the sleeve block in a vertical direction relative to the lock mechanism activates sensors comprising: a proximity limit sensor that indicates that the sleeve is in a low alignment position; a proximity limit sensor that indicates that the sleeve is aligned for activation of the locking mechanism; and a proximity limit sensor that indicates that the sleeve is in a high alignment position.

9. The system of claim 1, wherein the lock mechanism provides remote feedback from the locking forks comprising: a signal from a limit switch that indicates the forks are fully extended, preventing further extension and indicating that vertical travel is not possible; a signal from a limit switch that indicates that the forks are fully retracted, preventing further retraction, and that vertical travel is possible.

* * * * *